United States Patent
Kerns

[19]

[11] Patent Number: 6,078,860
[45] Date of Patent: Jun. 20, 2000

[54] METHOD AND SYSTEM FOR CONTROLLING THE SPEED OF A VEHICLE

[75] Inventor: James Michael Kerns, Trenton, Mich.

[73] Assignee: Ford Global Technologies, Inc., Dearborn, Mich.

[21] Appl. No.: 09/078,752

[22] Filed: May 14, 1998

[51] Int. Cl.$^7$ .................................................. B60K 31/00
[52] U.S. Cl. .......................................... 701/93; 123/399
[58] Field of Search .............................. 701/93; 180/170, 180/178, 179; 123/349, 350, 376, 379, 399

[56] References Cited

U.S. PATENT DOCUMENTS

| | | |
|---|---|---|
| 4,541,052 | 9/1985 | McCullouch . |
| 4,615,409 | 10/1986 | Kupper et al. . |
| 4,831,533 | 5/1989 | Skoldheden . |
| 4,961,146 | 10/1990 | Kajiwara .................................... 701/93 |
| 5,012,418 | 4/1991 | Petzold . |
| 5,285,864 | 2/1994 | Sakita . |
| 5,307,776 | 5/1994 | Unuvar et al. . |
| 5,605,131 | 2/1997 | Ohno et al. . |
| 5,625,558 | 4/1997 | Togai et al. . |

*Primary Examiner*—Michael J. Zanelli
*Attorney, Agent, or Firm*—Allan J. Lippa; Roger L. May

[57] ABSTRACT

A method and system for controlling the speed of a vehicle senses a position of an accelerator pedal. In a first embodiment, the accelerator pedal has a mechanical predetermined natural position, wherein when the position of the accelerator pedal is held constant at the predetermined natural position the control logic interprets the position of the pedal as a request for constant vehicle speed. However, at low vehicle speeds, the control logic interprets the position of the pedal as a request for constant vehicle speed when the position of the pedal is held constant at a position below the predetermined natural position and controls the speed of the vehicle according to a predetermined zero acceleration curve. In a second embodiment, constant speed control is assumed when the position of the pedal has not changed for a predetermined amount of time, regardless of the relative position of the pedal. Any torque offsets encountered during the constant speed mode is reduced and eventually eliminated when the constant speed mode is exited and the pedal position increases/decreases.

20 Claims, 10 Drawing Sheets

US 6,078,860

METHOD AND SYSTEM FOR CONTROLLING THE SPEED OF A VEHICLE

TECHNICAL FIELD

This invention relates to methods and systems for controlling the speed of a vehicle based on a position of the accelerator pedal.

BACKGROUND ART

Current typical vehicle speed control systems utilize dashboard/steering wheel controls to regulate the speed of a vehicle at a level set by the driver without the driver having to maintain pressure on the accelerator pedal. The driver brings the car up to a desired speed and turns on the cruise control. Next, the driver programs that speed into the system by pressing a button. A sensor measures the speed at which the vehicle is traveling. Based on the difference, if any, between the actual speed of the vehicle and the desired speed set by the driver, a control logic controls a servo motor to set the throttle so that the speed of the engine is at the level needed to have the car travel at the desired speed. This type of cruise control, however, is difficult to use in traffic since frequent changes in the desired speed are required.

In order to accommodate the driver's typical behavior in traffic, cruise control systems have been developed that control the speed of the vehicle based on a position of the accelerator pedal. For example, one known prior art control system disclosed in U.S. Pat. No. 4,615,409 provides a snap-in detention device at the junction point of an acceleration section and a deceleration section such that a foot can rest with a force slightly above the weight of the foot against the accelerator pedal while the speed of the motor vehicle is maintained constant. However, for low vehicle speeds (i.e., deceleration or starting from a stop position), the driver is required to push the accelerator pedal to a predefined "0" position to get the vehicle moving.

Another known prior art speed control system that utilizes the position of the accelerator pedal to maintain the speed of the vehicle is disclosed in U.S. Pat. No. 4,541,052. In this system, the speed of the vehicle is controlled based on whether the accelerator pedal is an a transient operation mode or in a steady state operation mode. When steady state s indicated, the vehicle power output is brought into correspondence with a power command determined according to the difference between the vehicle velocity and a remembered velocity. This system, however, describes a linear relationship between output power and accelerator position which does not result in a normal feel for a driver used to existing vehicles which have a nonlinear relationship that varies with engine speed.

DISCLOSURE OF THE INVENTION

It is thus a general object of the present invention to provide a method and system for controlling the speed of a vehicle utilizing the accelerator pedal without disrupting the natural feel of the accelerator pedal and maintaining the relationship between the pedal position and vehicle performance at all vehicle speeds.

In carrying out the above object and other objects, features, and advantages of the present invention, a method is provided for controlling the speed of a vehicle based on a position of the accelerator pedal. In a first embodiment, control logic is provided that is operative to control the speed of the vehicle at a constant speed when the position of the accelerator pedal is held at a position different from a predetermined natural position. In this embodiment, the method includes sensing a speed of the vehicle, sensing a position of the accelerator pedal, determining if the speed of the vehicle is less than a predetermined low speed threshold, and controlling the speed of the vehicle at a constant speed when the position of the pedal is held below the predetermined natural position and the speed of the vehicle is less than the predetermined low speed threshold.

In the second embodiment, the method includes sensing a speed of the vehicle, sensing a position of the accelerator pedal, determining a first offset during a constant speed mode according to a predetermined torque curve, the speed of the vehicle, the position of the accelerator pedal, and a torque required to maintain the constant speed, determining a second offset based on the first offset and the position of the accelerator pedal when the vehicle has exited the constant speed mode, and controlling the speed of the vehicle during a non-constant speed mode based on the predetermined torque curve, the second offset, the speed of the vehicle and the position of the accelerator pedal.

In further carrying out the above object and other objects, features, and advantages of the present invention, a system is also provided for carrying out the steps of the above described methods. The system for the first embodiment includes a speed sensor for sensing a speed of the vehicle, a position sensor for sensing a position of the accelerator pedal, and control logic operative to determine if the position of the pedal is held constant for a predetermined amount of time, determine if the speed of the vehicle is less than a predetermined low speed threshold, and control the speed of the vehicle at a constant speed when the position of the pedal is held constant below the predetermined natural position and the speed of the vehicle is less than the predetermined low speed threshold.

The system for the second embodiment includes a speed sensor for sensing a speed of the vehicle, a position sensor for sensing a position of the accelerator pedal and control logic operative to determine a first offset during the constant speed mode according to a predetermined torque curve, the speed of the vehicle, the position of the accelerator pedal and a torque required to maintain the constant speed, determine a second offset based on the first offset and the position of the accelerator pedal when the vehicle has exited the constant speed mode, and control the speed of the vehicle during the non-constant speed mode based on the predetermined torque curve, the second offset, the speed of the vehicle and the position of the accelerator pedal.

The above object and other objects, features and advantages of the present invention are readily apparent from the following detailed description of the best mode for carrying out the invention when taken in connection with the accompanying drawings.

BEST MODE FOR CARRYING OUT THE INVENTION

Figure 1:
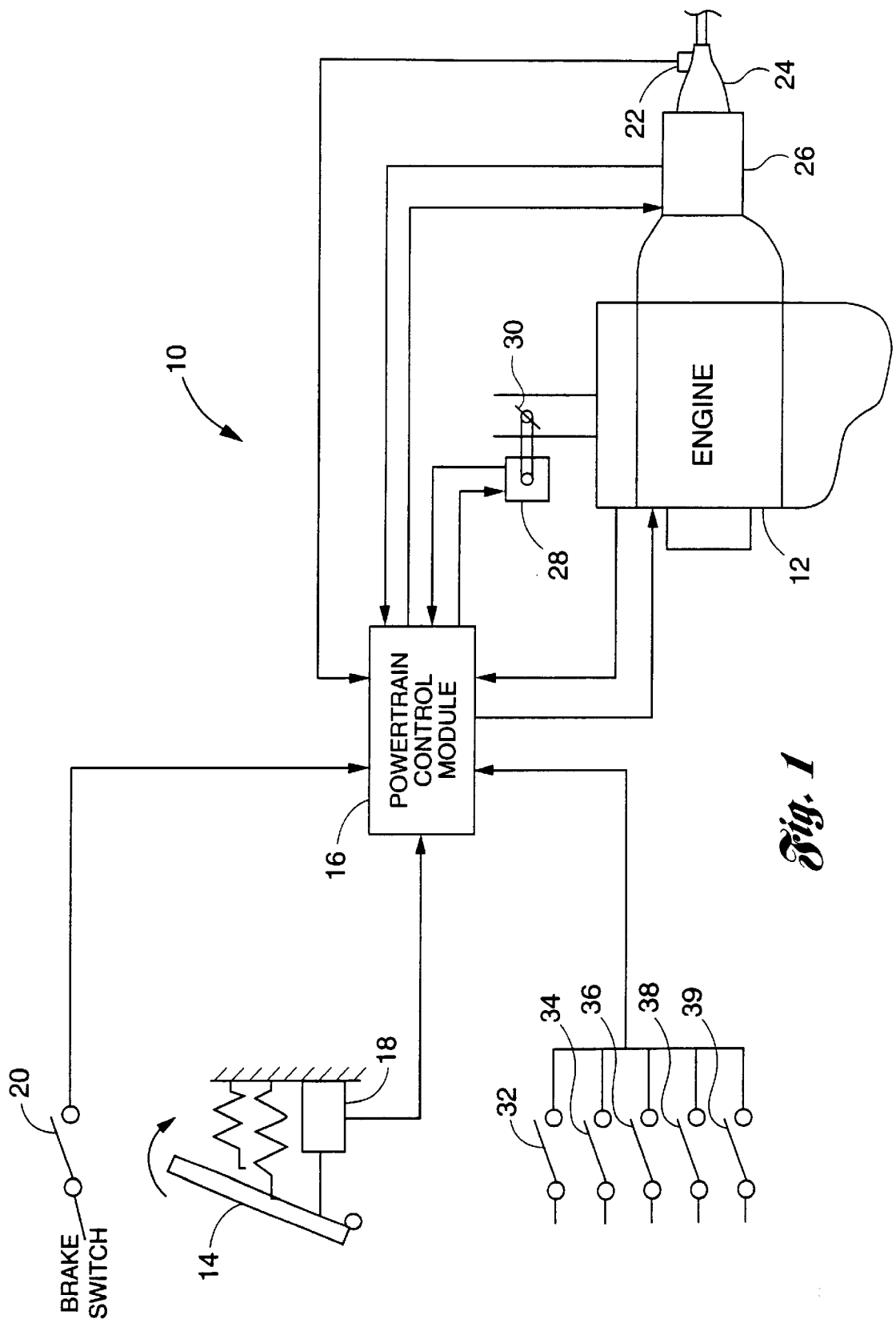
FIG. 1 is a schematic diagram of an internal combustion engine, an accelerator pedal and a powertrain control module which embody the principles of the present invention.

Turning now to FIG. 1, there is shown a schematic diagram of a system, denoted generally by reference numeral 10, including an internal combustion engine 12, an accelerator pedal 14 and a Powertrain Control Module (PCM) 16 which embody the principles of the present invention. The accelerator pedal 14 is used by the driver to control the vehicle speed. The accelerator pedal 14 is connected to a position sensor 18 such as, for example, a potentiometer, which generates a signal indicating the position of the accelerator pedal 14.

The position signal is transmitted to the PCM 16 which contains predetermined control logic for controlling the speed and acceleration of the vehicle based on the position of the accelerator pedal 14 and various other inputs, as described below. The PCM 16 can be embodied by an electronically-programmable microprocessor, a microcontroller, an application-specific integrated circuit, or a like device to provide the predetermined control logic.

The other inputs to the PCM 16 include a signal from a switch 20 in a brake system used to determine when the brake (not shown) is pressed, a signal corresponding to a speed of the vehicle from a speed sensor 22 disposed on a drive shaft 24, or alternatively, on a wheel (not shown) of the vehicle, a signal from the transmission 26 indicating the current gear of the transmission 26, a signal from the engine 12 indicating a temperature of the engine, and an air flow meter 28 coupled to a throttle plate 30 indicating the position of the throttle plate 30 and the amount of air flow into the engine 12. In addition, inputs similar to conventional cruise control switches such as signals from, but not limited to, an ON switch 32, an OFF switch 34, an ACCELERATE switch 36, a DECELERATE switch 38, and a SET switch 39 may be included to provide the conventional "foot off the pedal" speed control functionality that may be convenient for highway travel.

The present invention, however, enables the driver of the vehicle to control or maintain the speed of the vehicle utilizing only the position of the accelerator pedal 14. In a first embodiment, the method and system provides a tactile feedback which allows the driver to consciously select constant speed operation. In a second embodiment, the method and system provides constant speed operation by automatically interpreting the intent of the driver in an unobtrusive manner.

In the first embodiment, the accelerator pedal 14 has a mechanical predetermined "natural" position that allows the driver to easily position the pedal in a position that for most vehicle speeds is interpreted by the PCM 16 as a request to maintain the current vehicle speed. Pushing the pedal 14 beyond the natural position is interpreted as a request for a vehicle acceleration, while releasing the pedal 14 is interpreted as a request for deceleration. The rate of acceleration/deceleration varies as a function of the distance from the natural position.

Figure 2A:
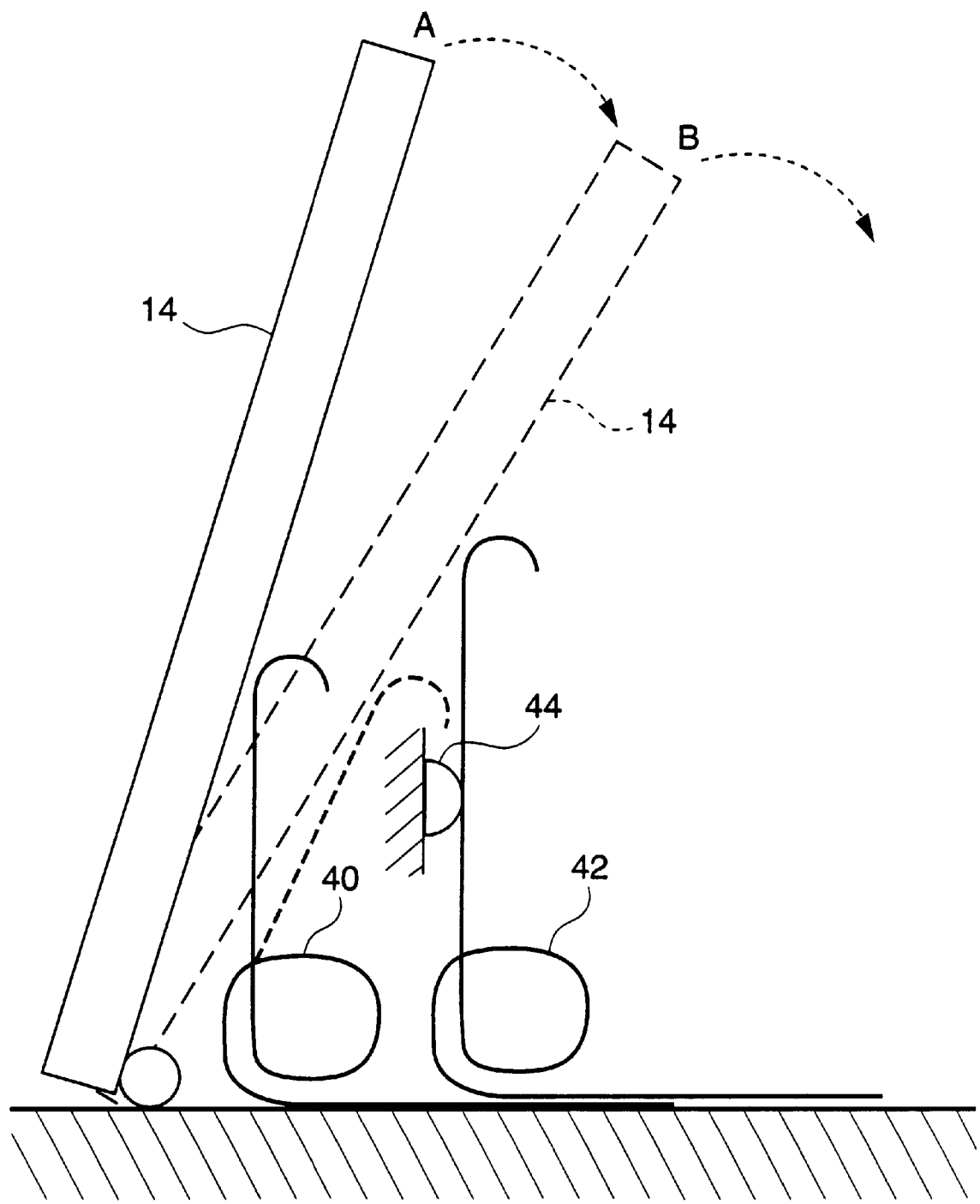
FIGS. 2a–2b are schematic diagrams of alternative spring arrangements of the accelerator pedal of the present invention.
Figure 2B:
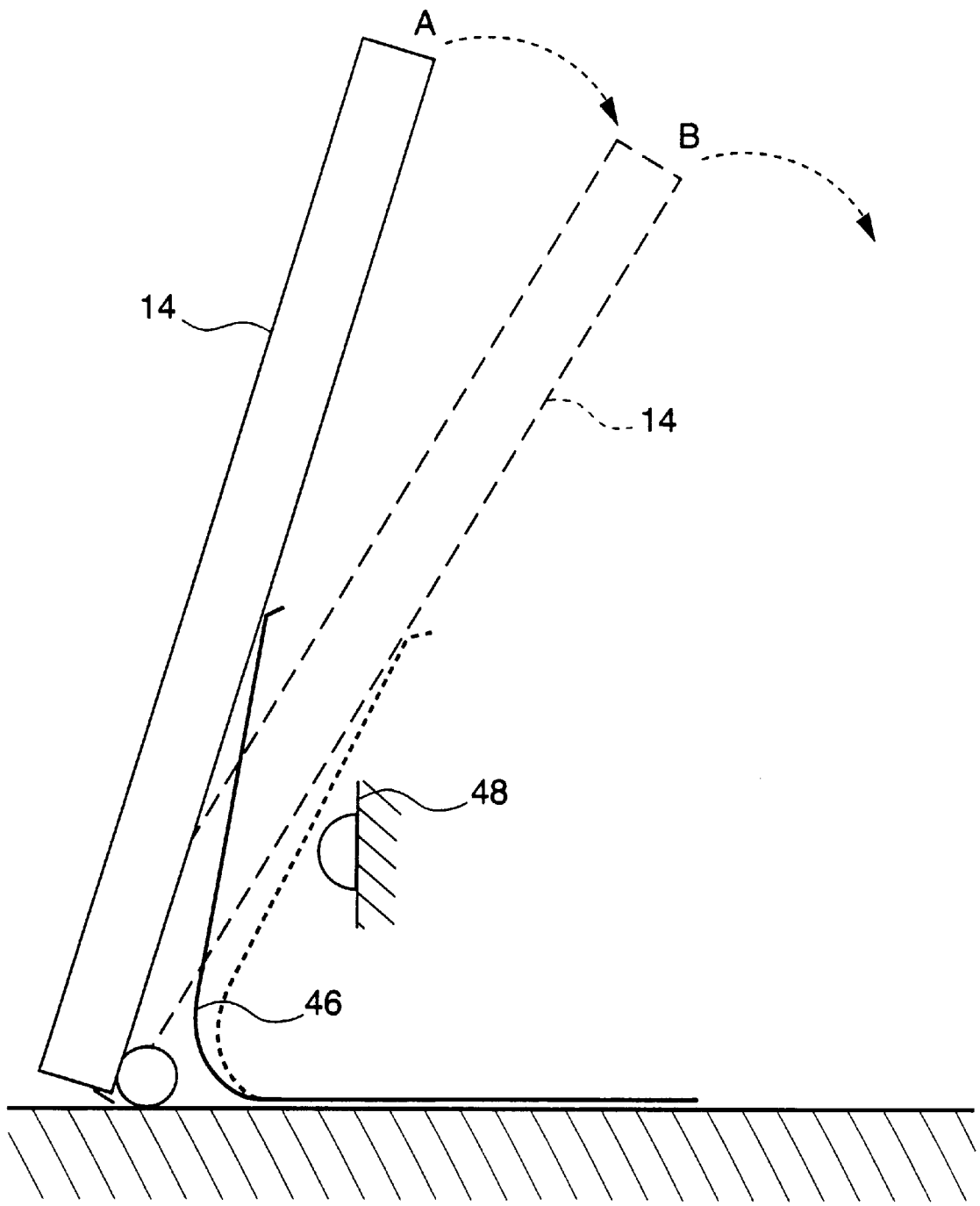

FIGS. 2a and 2b show simplified examples of two spring arrangements that provide a change in the pedal return force that can be easily felt by the driver of the vehicle. In FIG. 2a, two springs 40, 42 are utilized. Spring 40 is in constant contact with the pedal 14 and provides a gentle force when the pedal 14 is between positions A and B, where position A corresponds to a relaxed position, i.e., 0% of pedal travel, of the pedal 14 and position B corresponds to the natural position, e.g., 25% of pedal travel of the pedal 14. At position B, the pedal 14 contacts the second spring 42 which is held in place by a pre-load provided by stop 44. The stop 44 is fixably mounted to a housing of the pedal assembly at a position dependent upon the arrangement of the springs 40, 42.

Figure 3A:
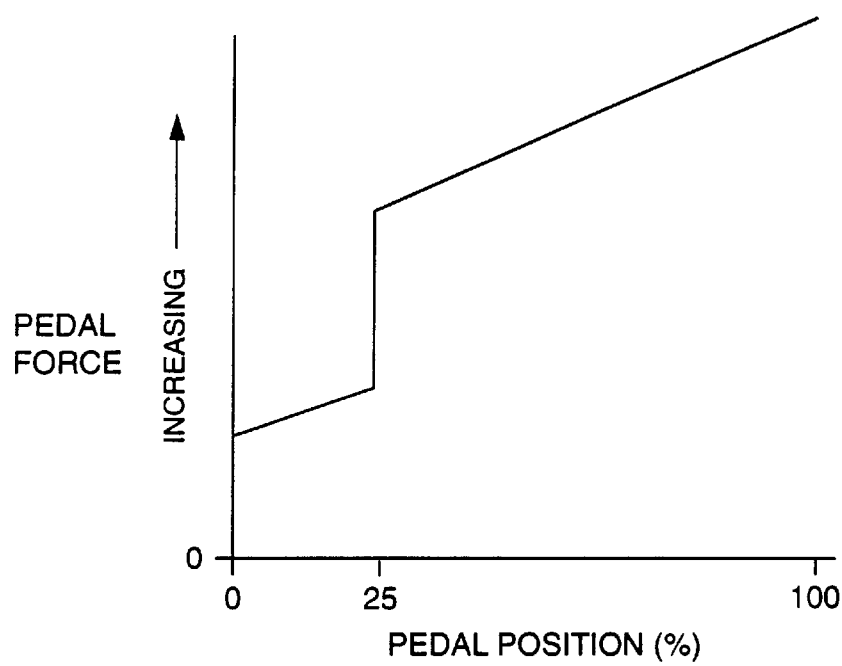
FIGS. 3a–3b are graphs illustrating the amount of force required to move the accelerator pedal beyond the "natural" position of the accelerator pedal.

To move the pedal 14 beyond position B, the driver must first overcome the pre-load force and then move the pedal against the combined force from both springs 40, 42. With this arrangement, the force required to move the pedal 14 is shown in FIG. 3a.

Figure 3B:
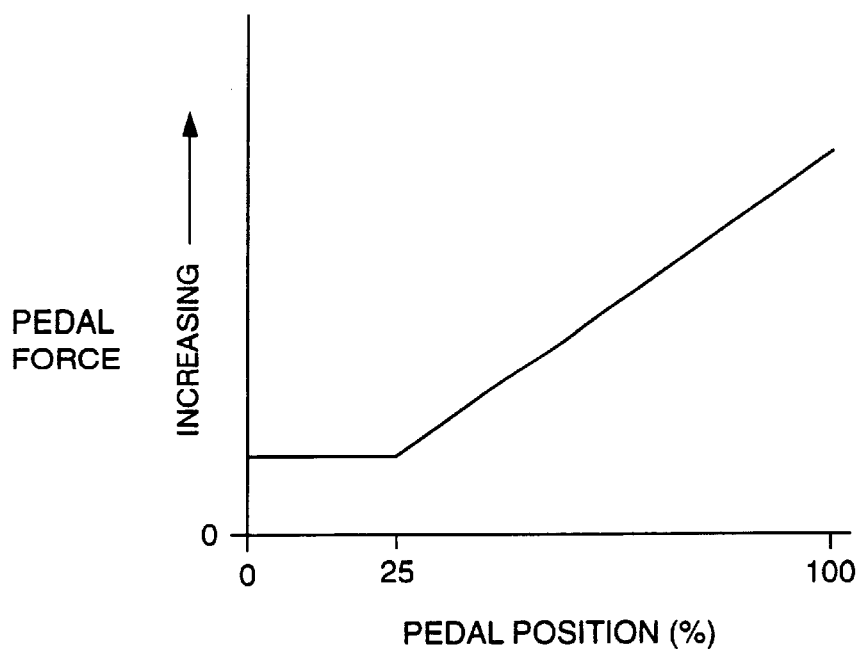

In FIG. 2b, the pedal 14 bears against a single spring 46. Between positions A and B, the entire length of the spring 46 is free to flex and provides a light force. At position B, the spring encounters a fixed stop 48 mounted to the housing of the pedal assembly. As the pedal 14 is moved beyond position B, the force required to deflect the spring 46 increases rapidly since the spring 46 is now constrained to bend around the stop 48. The resulting change in force required to move the pedal 14, as shown in FIG. 3b, is easily detected by the driver and allows the driver to find the "natural" position.

Figure 4:
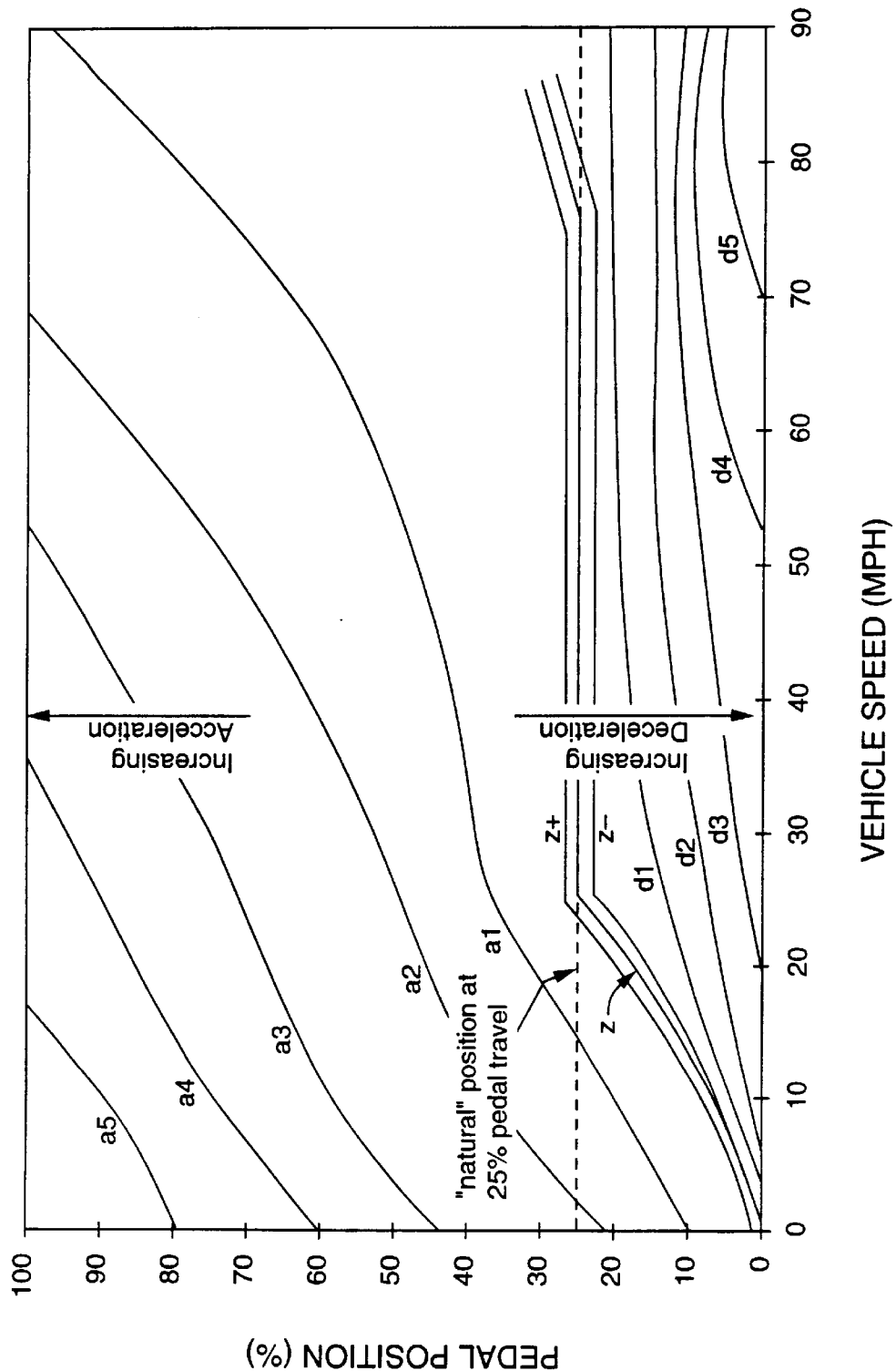
FIG. 4 is a graph illustrating how the position of the pedal is interpreted as a request for vehicle acceleration as a function of speed.

Turning now to FIG. 4, there is shown a graph illustrating how the PCM 16 interprets the position of the pedal 14 as a request for vehicle acceleration as a function of speed. The curves a1–a5 represent lines of constant vehicle acceleration rates (the rate of acceleration increases from a1 to a5). Curves z, z+ and z– represent the pedal position/vehicle speed regions that are interpreted as a request for zero acceleration, i.e., constant vehicle speed. The distance between z+ and z– is provided to allow for small errors in the sensor 18 and other parts of the mechanical system.

Curves d1 through d5 represent lines of constant negative acceleration (deceleration). Thus, as the driver continues to press the pedal 14, the vehicle will continue to accelerate according to the a curves until the driver allows the pedal 14 to fall back to the natural position. Similarly, letting up on the pedal 14 from controlled speed operation causes the vehicle to decelerate according to the d curves.

At low vehicle speeds, the z curve deviates from the natural position of the pedal 14. This provides vehicle operation that is similar to the driver's current expectation, i.e., it is not necessary to move the pedal beyond the natural position to start the vehicle in motion. This also eliminates problems with mode transitions that would occur if the speed control mode were simply disabled at low vehicle speeds. For example, if the driver presses the pedal 14 at 10% of full travel, the vehicle accelerates at a rate defined by a1, as shown in FIG. 4. As the vehicle speed increases, the rate of acceleration is decreased until the vehicle speed reaches approximately 15 mph, i.e., the position of the pedal 14 that corresponds to zero acceleration, as shown in FIG. 4. This speed is maintained until the driver either lets up on the pedal 14 or pushes the pedal 14. This effect would feel natural to the driver of the vehicle.

At higher vehicle speeds, the z curve may, if desired, be made to deviate from the natural position to discourage sustained high speed vehicle operation. As shown in FIG. 4, the driver of the vehicle must hold the pedal 14 down beyond the natural position in order to maintain a constant vehicle speed according to the z curves.

Once the desired rate of acceleration is determined, the PCM 16 commands a change in the powertrain output to achieve the desired acceleration and speed. The PCM 16 uses various actuators to control the powertrain output to proved the desired vehicle acceleration. An electronic throttle actuation device 28 is used to control the position of the throttle 30 and, thus, airflow into the engine 12. The PCM 16 also controls other engine actuators such as fuel injectors (not shown) which control the quantity of fuel ingested by the engine 12, the system that controls the timing of the spark used for ignition, and other devices to insure efficient engine operation. In addition to controlling the states of the engine 12, the PCM 16 can also use actuators (not shown) in the transmission 26 that control the transmission gear ratio and torque converter clutches to provide efficient operation and adequate acceleration rates.

Figure 5:
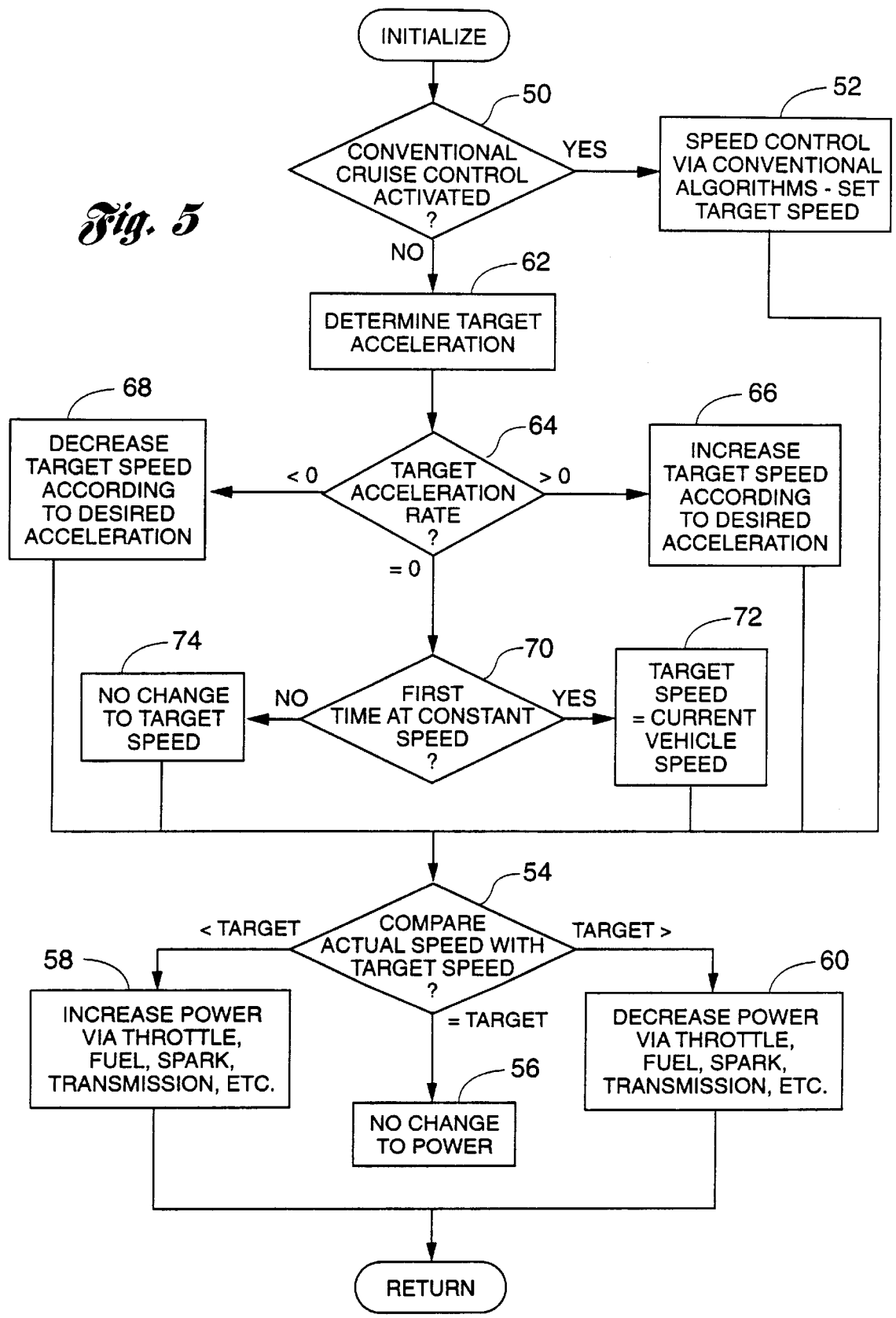
FIG. 5 is a flow diagram illustrating the general sequence of steps associated with the operation of a first embodiment of the present invention.

Turning now to FIG. 5, there is shown a flow diagram illustrating the general sequence of steps associated with the method of the first embodiment of the present invention. Although the steps shown in FIG. 5 are depicted sequentially, they can be implemented utilizing interrupt-driven programming strategies, object-oriented programming, or the like. In a preferred embodiment, the steps shown in FIG. 5 comprise a portion of a larger routine which performs other speed control functions.

Upon initialization, the method begins with the step of determining whether the conventional cruise control system has been activated, as shown at conditional block 50. If so, the speed of the vehicle is controlled according to a set target speed, as shown at block 52. To maintain the target speed, the actual speed of the vehicle is compared with the target speed, as shown at conditional block 54. If there is no difference between the two speeds, there is no change in the powertrain output, as shown at block 56.

If the actual speed of the vehicle is less than the target speed, the powertrain output is increased, as shown at block 58. As discussed above, this can be accomplished by controlling the throttle position, fuel flow, spark timing, transmission gear ratio, etc., to match the target speed via known closed loop control techniques. Similarly, if the actual speed of the vehicle exceeds the target speed, then the powertrain output is decreased, as shown at block 60.

Returning to conditional block 50, if conventional cruise control has not been activated, the method proceeds to determine a target acceleration according to the predetermined acceleration curves illustrated in FIG. 4, as shown at block 62. Next, a determination is made as to whether the target acceleration is positive, negative, or zero, as shown at conditional block 64.

If the target acceleration rate is positive, i.e., the driver has pressed the accelerator pedal 14 beyond the Z-curve, the target speed is increased according to the position of the pedal 14 and the corresponding acceleration curve, as shown at block 66. The method then proceeds to control the powertrain output as discussed above.

If the target acceleration rate is negative, i.e., the driver has let up on the pedal 14, the target speed is decreased according to the position of the pedal 14 and the corresponding deceleration curve, as shown at block 68. As with the positive acceleration rate target, the method proceeds to control the powertrain output as discussed above.

If, on the other hand, the target acceleration rate is zero, i.e., the driver has positioned the pedal 14 at a point on the Z-curve, a determination is first made as to whether this is the initiation of constant speed mode, as shown at conditional block 70. Keep in mind that this constant position does not necessarily have to be at the mechanical predetermined natural position. For lower vehicle speeds, this position decreases from the natural position. At higher vehicle speeds, this position increases from the natural position. If this is the first initiation of constant speed mode, the target speed is set equal to the current vehicle speed, as shown at block 72. If not, the there is no change to the target speed, as shown at block 74. The method proceeds to control the powertrain output as discussed above.

Returning to the discussion of the second embodiment mentioned above, the desire for constant speed operation is determined by observing the behavior of the pedal 14 and subsequent vehicle response. If the driver is holding the pedal at a constant position, and the vehicle speed has been nearly constant for some period of time, the PCM 16 then decides that the driver intends to maintain that speed. The PCM 16 maintains the vehicle speed until the driver changes the position of the pedal 14. The change in the position of the pedal 14 is interpreted as a request to accelerate or decelerate at a rate related to the magnitude of the change in the position of the pedal 14.

Figure 6:
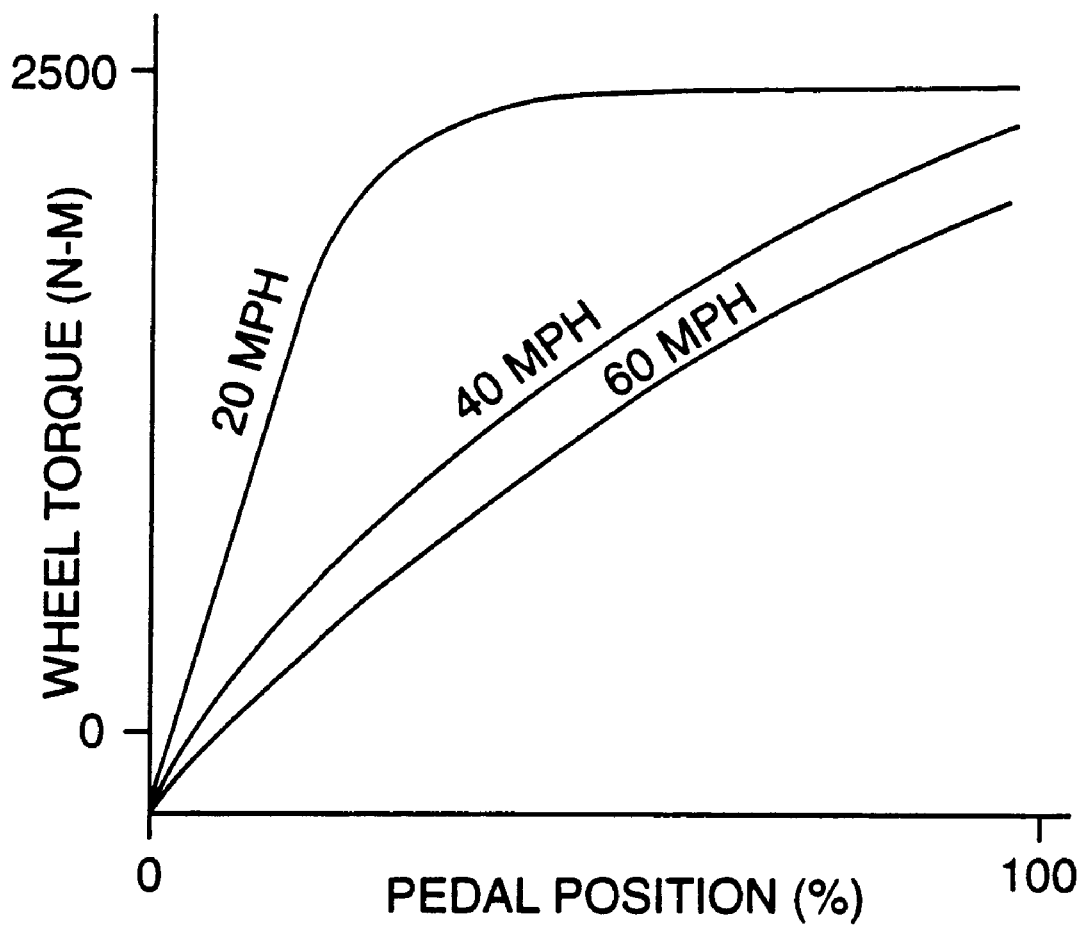
FIG. 6 is a graph illustrating the relationship between a measured pedal position and the desired powertrain torque at various vehicle speeds for the second embodiment of the present invention.

Turning now to FIG. 6, there is shown a graph illustrating the desired relationship between the position of the pedal 14 and the powertrain output torque for various vehicle speeds. Note that the maximum powertrain torque is lower at higher speeds. This is due to the required changes in transmission gear ratio. Also, this curve may be modified for factors such as barometric pressure, which would limit the torque available from the powertrain.

Figure 7A:
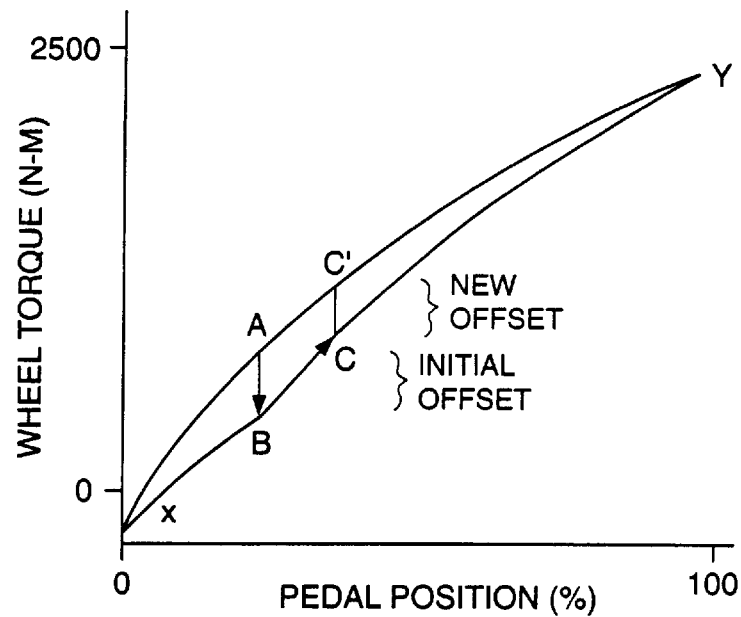
FIGS. 7a–7b are graphs illustrating the behavior of the pedal position/torque relationship at a particular vehicle speed during a possible scenario where the constant speed mode is engaged and exited for the second embodiment.

The operation of the present invention will now be discussed with reference to FIGS. 7a–7b. FIG. 7a represents a potential scenario where the speed control mode is entered at point A; the curve X,A,Y is the pedal position/torque curve at 40 mph from FIG. 6. If the torque required to maintain the desired speed is reduced to point B (e.g., the vehicle is going downhill) and the driver decides to accelerate and move the pedal 14, the relationship between the pedal position and the torque will now be represented by the curve X,B,C,Y.

Figure 7B:
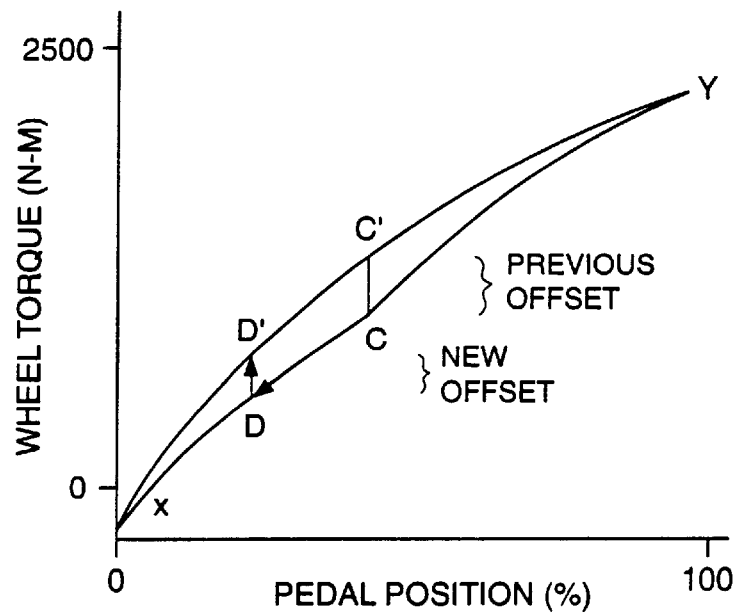

If the pedal is moved to point C, it is clear that the torque offset (C'-C) is smaller than the original offset (A-B) and now the curve X,D,C,Y in FIG. 7b describes the pedal/torque relationship. Additional changes to the pedal position (e.g., to point D) further reduces the offset and defines new pedal/torque relationships which will converge back to the original curve.

During normal operation the desired powertrain output torque is calculated as a function of pedal position and vehicle speed, as shown in FIG. 6, and other modifiers such as barometric pressure (measured or estimated). The vehicle operation is very similar to what the driver has become accustomed to today with current vehicles. However, if it is determined that the vehicle is operating at a nearly constant speed and the driver is holding the pedal at a constant position, the system 10 will assume that the driver wishes to drive at a constant speed. The system 10 will then enter a closed loop speed control mode.

During operation in the closed loop speed control mode, the system 10 modifies the torque output of the powertrain by changing the throttle position, fuel flow, transmission gear if applicable, etc., to maintain the vehicle speed. Consequently, the actual powertrain torque at this constant pedal position may deviate from the torque derived from FIG. 6.

If the driver changes the pedal position (or presses on the brake), the closed loop speed control mode is exited. At this point, it is desirable to smoothly reduce the torque offset that may have resulted from the closed loop operation. This invention does this by reducing the offset as the pedal is moved such that the offset would be reduced to zero at each extreme of the pedal travel. By reducing the offset with each pedal movement, the system will, in time, reduce the offset to nearly zero even if the pedal is never moved to either end of its pedal movement range as discussed with reference to FIGS. 7a–7b.

Figure 8A:
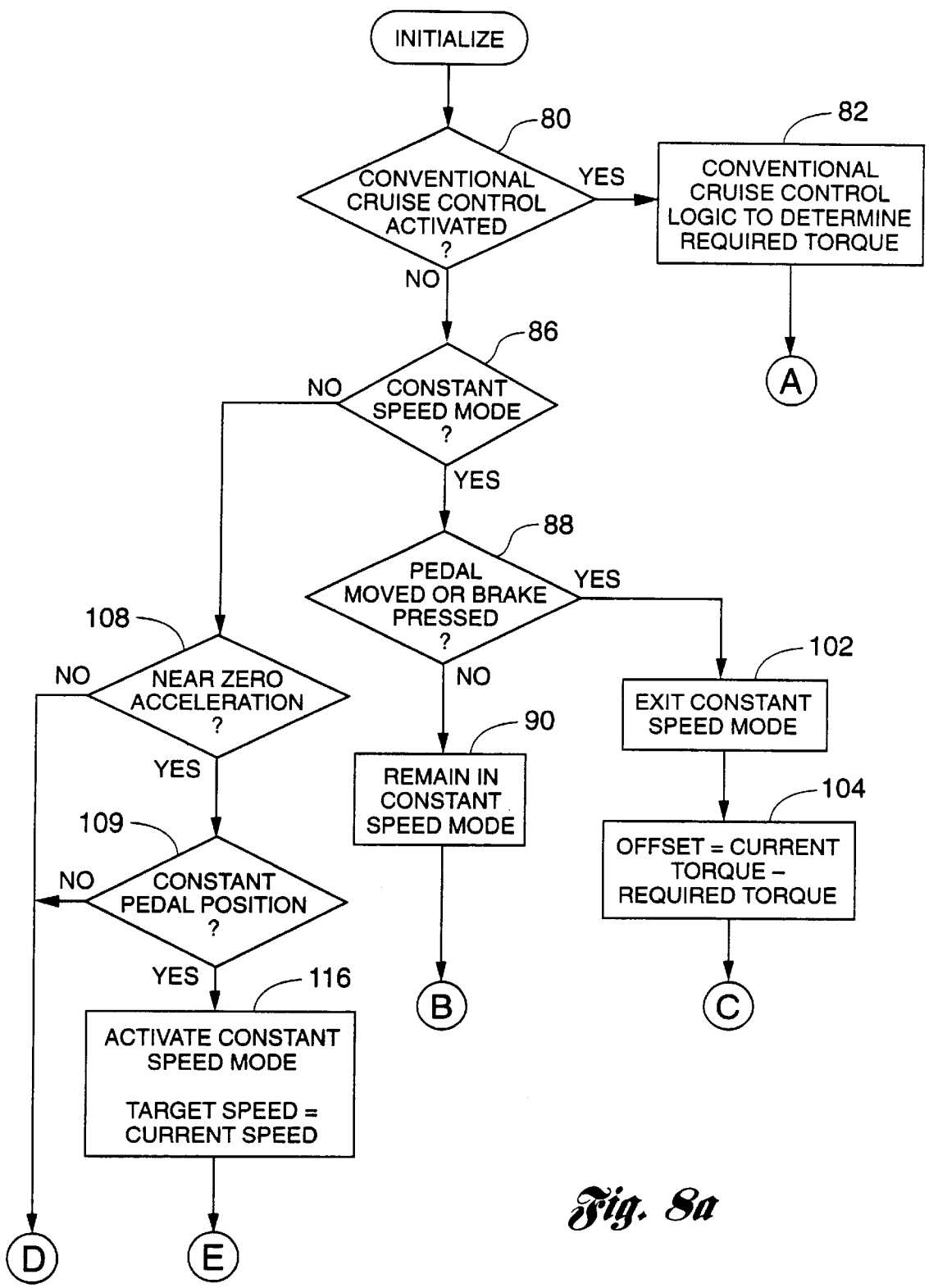
FIGS. 8a–8b are flow diagrams illustrating the general sequence of steps associated with the operation of a second embodiment of the present invention.
Figure 8B:
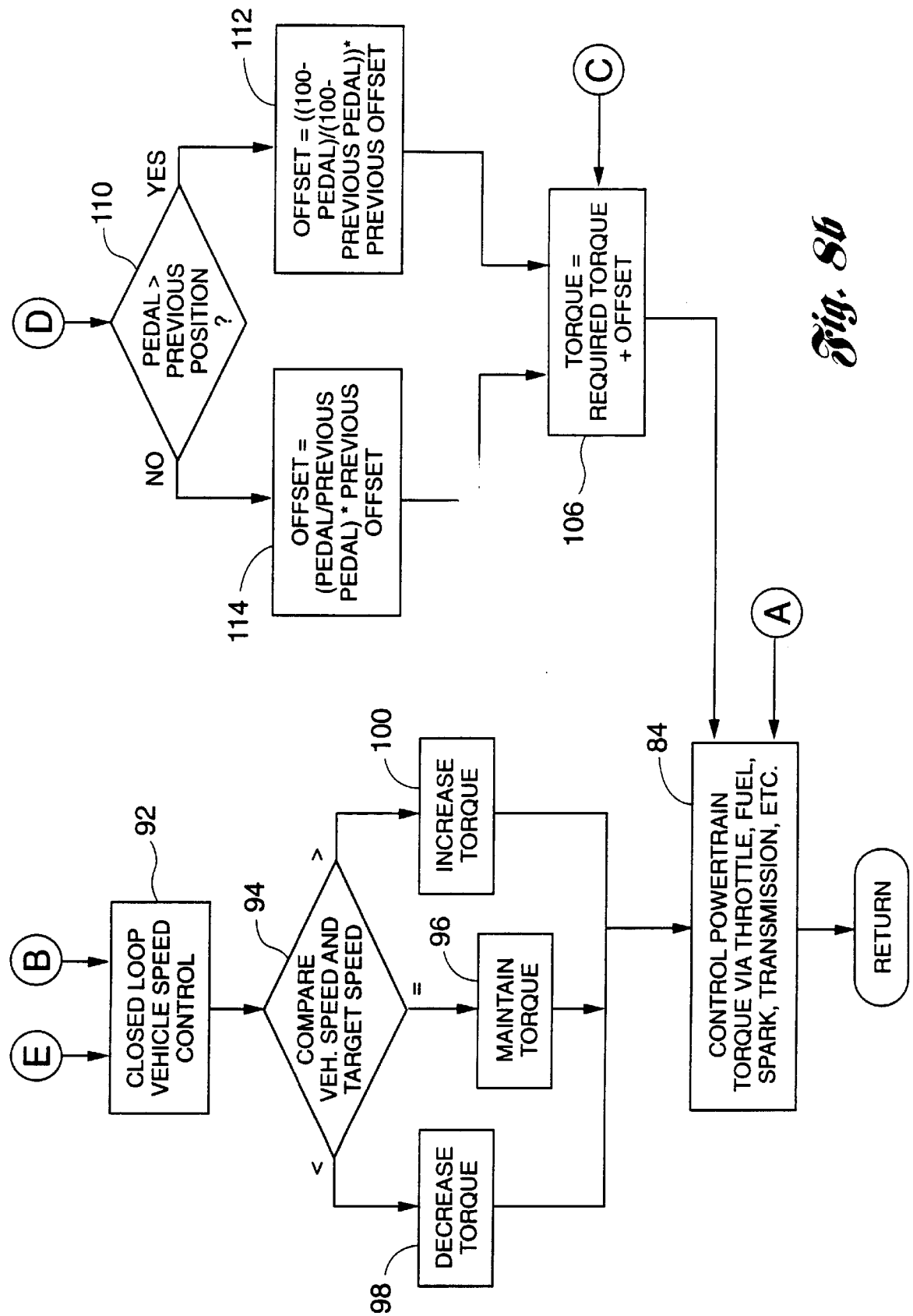

Turning now to FIGS. 8a–8b, there are shown flow diagrams illustrating the general sequence of steps associated with the method of the second embodiment of the present invention. Although the steps shown in FIGS. 8a–8b are depicted sequentially, they too can be implemented utilizing interrupt-driven programming strategies, object-oriented programming, or the like. In a preferred embodiment, the steps shown in FIGS. 8a–8b also comprise a portion of a larger routine which performs other speed control functions.

Upon initialization, the method begins with the step of determining whether the conventional cruise control system has been activated, as shown at conditional block 80. If so, the required torque is determined, as shown at block 82. The required torque is then controlled, as shown at block 84.

If conventional cruise control has not been activated, a determination is made as to whether the vehicle is in constant speed mode, as shown at conditional block 86. If the pedal 14 has been in the same position for the predetermined period of time, e.g., approximately five seconds, then constant speed mode is entered and the method proceeds to determine if the pedal 14 has moved any or the brake (not shown) has been pressed, as shown at conditional block 88. If there has been no movement by the pedal 14 or the brake, the system 10 remains in constant speed mode and proceeds to closed loop vehicle speed control, as shown at block 90 and 92, respectively.

Once in the closed loop vehicle speed control mode, a comparison is made between the actual vehicle speed and the target speed, as shown at conditional block 94. If the two speeds are the same, the current torque is maintained and controlled by the PCM 16, as shown at blocks 96 and 84, respectively. If the actual speed is either greater than or less than the target speed, the torque is decreased or increased, as shown at blocks 98 and 100, respectively. Thus, the actual torque at the constant pedal position may deviate from the torque value derived from the predetermined torque curve shown in FIG. 6.

Returning to conditional block 88, if the pedal 14 has moved or the brake has been pressed, the constant speed mode is exited, as shown at block 102. At block 104, an offset value is determined based on the difference between the current torque value and the torque value derived from the torque curve in FIG. 6. The torque delivered by the powertrain is updated based on the torque value from the predetermined torque curve plus the offset, as shown at block 106. This offset insures that there is no abrupt transition between constant speed control and manual acceleration/deceleration.

Returning to conditional block 86, after the vehicle has initially exited from the constant speed mode, following block 106, a determination is made as to whether the vehicle is at near zero acceleration, as shown at conditional block 108, or whether the position of the pedal is not constant, as shown at conditional block 109. If the vehicle is not at near zero acceleration or if so, but the pedal position is not constant, a determination is then made as to whether the vehicle is accelerating or decelerating following the constant speed mode, as shown at conditional block 110. If the vehicle is accelerating, i.e., the position of the pedal 14 is greater than the previous position of the pedal 14, then an acceleration offset is determined based on the previous offset value, as shown at block 112, according to the following:

Acceleration Offset=((100-pedal position)/(100-previous pedal position))*Previous Offset.

If the vehicle is decelerating, a deceleration offset is determined based on the previous offset value, as shown at block 114, according to the following:

Deceleration Offset=(current pedal position/previous pedal position)*Previous Offset.

The torque delivered by the powertrain is based on the torque curve from FIG. 6 and the new acceleration or deceleration torque, as shown at block 106. Thus, the offset resulting from the constant speed mode is continuously reduced so as to eventually eliminate the offset. If the vehicle had not initially been in constant speed mode, the offset would have been zero and the torque to be delivered by the powertrain would be equal to the torque derived from the torque curve in FIG. 6.

If the vehicle is at near zero acceleration, conditional block 108, and the pedal position is constant, conditional block 109, then constant speed mode is activated and the target speed is set at the current vehicle speed, as shown at block 116. At this point, the method proceeds to operate in closed loop speed control, as shown at block 92.

While the best modes for carrying out the invention have been described in detail, those familiar with the art to which this invention relates will recognize various alternative designs and embodiments for practicing the invention as defined by the following claims.

What is claimed is:

1. A method for controlling the speed of a vehicle including control logic for controlling the speed of the vehicle and an accelerator pedal having a mechanical predetermined natural position, wherein when the position of the accelerator pedal is held at the predetermined natural position the control logic interprets the position of the pedal as a request for constant vehicle speed, the method comprising:

sensing a speed of the vehicle;

sensing a position of the accelerator pedal;

determining if the speed of the vehicle is less than a predetermined low speed threshold; and controlling the speed of the vehicle according to a first predetermined zero acceleration curve when the position of the pedal is below the predetermined natural position.

2. The method as recited in claim 1 wherein controlling the speed of the vehicle includes interpreting the position of the pedal as a request for constant low vehicle speed when the position of the pedal is at a position below the predetermined natural position.

3. The method as recited in claim 1 further comprising:

determining if the speed of the vehicle exceeds a predetermined high speed threshold; and if so, controlling the speed of the vehicle according to a second predetermined zero acceleration curve when the position of the pedal is above the predetermined natural position.

4. The method as recited in claim 3 wherein controlling the speed of the vehicle according to the second predetermined zero acceleration includes interpreting the position of the pedal as a request for constant high vehicle speed when the position of the pedal is at a position above the predetermined natural position.

5. A system for controlling the speed of a vehicle including an accelerator pedal having a mechanical predetermined natural position, the system comprising:

a speed sensor for sensing a speed of the vehicle;

a position sensor for sensing a position of the accelerator pedal; and control logic operative to determine if the speed of the vehicle is less than a predetermined low speed threshold, and control the speed of the vehicle according to a first predetermined zero acceleration curve when the position of the pedal is below the predetermined natural position wherein the control logic normally interprets the position of the pedal as a request for constant vehicle speed when the position of the accelerator pedal is held at the predetermined natural position.

6. The system as recited in claim 5 wherein the control logic, in controlling the speed of the vehicle, is further operative to interpret the position of the pedal as a request for constant low vehicle speed when the position of the pedal is at a position below the predetermined natural position.

7. The system as recited in claim 5 wherein the control logic is further operative to determine if the speed of the vehicle exceeds a predetermined high speed threshold, and if so, control the speed of the vehicle according to a second predetermined zero acceleration curve when the position of the pedal is above the predetermined natural position.

8. The system as recited in claim 7 wherein the control logic, in controlling the speed of the vehicle according to the second predetermined zero acceleration, is further operative to interpret the position of the pedal as a request for constant high vehicle speed when the position of the pedal is at a position above the predetermined natural position.

9. A method for controlling a speed of a vehicle during a non-constant speed mode, the vehicle having an accelerator pedal and a constant speed mode, the method comprising:

sensing a speed of the vehicle;

sensing a position of the accelerator pedal;

determining a first offset during the constant speed mode according to a predetermined torque curve based on the position of the accelerator pedal, the speed of the vehicle and a torque required to maintain the speed of the vehicle;

determining a second offset when the vehicle has exited the constant speed mode based on the first offset and the position of the accelerator pedal; and controlling the speed of the vehicle during the non-constant speed mode based on the predetermined torque curve, the second offset, the speed of the vehicle and the position of the accelerator pedal.

10. The method as recited in claim 9 wherein determining the first offset comprises:

determining if the position of the pedal is held at a constant position for a predetermined amount of time;

determining a desired torque according to the predetermined torque curve based on the speed of the vehicle and the position of the accelerator pedal;

determining an actual torque applied to the vehicle based on the speed of the vehicle; and determining a difference between the actual torque and the desired torque.

11. The method as recited in claim 10 wherein determining the second offset includes determining if the position of the pedal has moved from the constantly held position.

12. The method as recited in claim 9 wherein determining the second offset includes determining whether the position of the pedal is increasing or decreasing.

13. The method as recited in claim 12 wherein determining the second offset when the position of the pedal is increasing includes determining the second offset according to the following:

Second Offset=((100-position of the pedal)/(100-previous position of the pedal))*First Offset.

14. The method as recited in claim 12 wherein determining the second offset when the position of the pedal is decreasing includes determining the second offset according to the following:

Second Offset=(position of the pedal/previous position of the pedal)*First Offset.

15. A system for controlling a speed of a vehicle during a non-constant speed mode, the vehicle having an accelerator pedal and a constant speed mode, the system comprising:

a speed sensor for sensing a speed of the vehicle;

a position sensor for sensing a position of the accelerator pedal; and control logic operative to determine a first offset during the constant speed mode according to a predetermined torque curve based on the speed of the vehicle, the position of the accelerator pedal and a torque required to maintain the speed of the vehicle, determine a second offset when the vehicle has exited the constant speed mode based on the first offset and the position of the accelerator pedal, and control the speed of the vehicle during the non-constant speed mode based on the predetermined torque curve, the second offset, the speed of the vehicle and the position of the accelerator pedal.

16. The system as recited in claim 15 wherein the control logic, in determining the first offset, is operative to determine if the position of the pedal is held at a constant position for a predetermined amount of time, determine a desired torque according to the predetermined torque curve based on the speed of the vehicle and the position of the accelerator pedal, determine an actual torque applied to the vehicle based on the speed of the vehicle, and determine a difference between the actual torque and the desired torque.

17. The system as recited in claim 16 wherein the control logic, in determining the second offset, is operative to determine if the position of the pedal has moved from the constantly held position.

18. The system as recited in claim 15 wherein the control logic, in determining the second offset, is operative to determine whether the position of the pedal is increasing or decreasing.

19. The system as recited in claim 18 wherein the control logic, in determining the second offset when the position of the pedal is increasing, is operative to determine the second offset according to the following:

Second Offset=((100-position of the pedal)/(100-previous position of the pedal))*First Offset.

20. The system as recited in claim 18 wherein the control logic, in determining the second offset when the position of the pedal is decreasing, is operative to determine the second offset according to the following:

Second Offset=(position of the pedal/previous position of the pedal)*First Offset.

* * * * *